US006621672B2

(12) United States Patent
Bilac

(10) Patent No.: US 6,621,672 B2
(45) Date of Patent: Sep. 16, 2003

(54) CIRCUIT BREAKER HAVING ANALOG OVERRIDE

(75) Inventor: Mario Bilac, Lawrenceville, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 127 days.

(21) Appl. No.: 09/968,368

(22) Filed: Oct. 1, 2001

(65) Prior Publication Data
US 2003/0063422 A1 Apr. 3, 2003

(51) Int. Cl.[7] .................................. H02H 3/28
(52) U.S. Cl. ........................ 361/44; 361/42; 361/93.1
(58) Field of Search ........................ 361/42–50, 71, 361/78, 79, 86, 87, 88, 90, 91.1, 91.2, 93.1, 93.4, 93.5, 93.6, 93.7

(56) References Cited

U.S. PATENT DOCUMENTS

| 4,631,625 A | * | 12/1986 | Alexander et al. ............ 361/94 |
| 4,682,264 A |   | 7/1987  | Demeyer .................... 361/96 |
| 5,335,135 A | * | 8/1994  | Kinney ...................... 361/79 |
| 5,436,785 A | * | 7/1995  | Ferrazzi et al. ............... 361/42 |
| 5,539,601 A |   | 7/1996  | Farag ....................... 361/23 |
| 5,629,870 A |   | 5/1997  | Farag et al. ............. 364/551.01 |
| 5,943,204 A |   | 8/1999  | Jones et al. ................... 361/93 |
| 6,018,451 A |   | 1/2000  | Lyke et al. ................ 361/93.2 |
| 6,141,197 A |   | 10/2000 | Kim et al. .................... 361/93 |
| 6,191,947 B1|   | 2/2001  | Titus et al. .................. 361/726 |
| 6,407,894 B1| * | 6/2002  | Bilac et al. ................... 361/44 |

FOREIGN PATENT DOCUMENTS

| DE | 199 27 030 A1 | 12/2000 |
| EP | 0 971 469 A2  | 1/2000  |

* cited by examiner

Primary Examiner—Adolf D. Berhane
Assistant Examiner—Gary L. Layton
(74) Attorney, Agent, or Firm—Foley & Lardner

(57) ABSTRACT

A circuit breaker having a trip mechanism and an electronic module having an application specific integrated circuit (ASIC), a control circuit, a composite circuit which generates a composite signal voltage, a residual circuit, the circuit breaker comprising a first power supply to provide a first voltage signal and a second power supply to provide a second voltage signal. An analog override circuit in the circuit breaker is configured to receive the first voltage signal from the first power supply, the second voltage signal from the second power supply and the composite signal voltage from the composite circuit. The analog override circuit provides an override signal to the ASIC which is coupled to a logic gate configured to receive a first trip signal from the control circuit and a second trip signal from the ASIC and provides a third trip signal to the trip mechanism.

16 Claims, 2 Drawing Sheets

CIRCUIT BREAKER HAVING ANALOG OVERRIDE

FIELD OF THE INVENTION

The present invention relates generally to the field of circuit breakers and more specifically to a circuit breaker having an analog override.

BACKGROUND OF THE INVENTION

A circuit breaker is typically characterized by a current rating which conventionally corresponds to the current at or above which the circuit breaker will trip (open), disconnecting a source of power from a load. The circuit breaker includes a current transformer (CT) having a winding in close proximity to a power line carrying alternating current. The current transformer provides a sense signal (e.g., a secondary current signal induced by the alternating current of the power line) representative of the power signal in the power line to the control circuitry of the circuit breaker. The control circuitry monitors the secondary current signal and trips the unit based on the monitored signal.

Circuit breakers come in a wide range of current ratings (e.g., 63 Amp, 80 Amp, 160 Amp, 200 Amp, 250 Amp, 400 Amp, 630 Amp, 800 Amp, 1000 Amp, 1250 Amp, 1600 Amp, etc.). Typically, each circuit breaker has a different CT having a rating corresponding to the desired rating of the circuit breaker. The winding of the CT is manufactured to be particularly suitable with the desired rating of the circuit breaker and correspondingly suitable to the current load carried in the power line. With the advent of electronic trip units (ETUs), for monitoring the secondary current signal and for tripping the circuit breaker, it has become necessary to manufacture an ETU for each line of circuit breakers based on the nominal circuit breaker rating.

According to one system, the ETU is provided with a hard-coded program that tells the ETU it is, for example, a 200 Amp circuit breaker. The drawback of this system is that ETUs must be inventoried for each current rating which adds significant cost and complexity to the manufacturing process of the circuit breakers. Another system utilizes programmable ETUs with software tables for all ratings of circuit breakers. A plastic connector (e.g., a jumper) is provided on the circuit board which couples one of a plurality of pins to ground to indicate to the ETU its rating and, correspondingly, which software table to use to interpret (e.g., scale) the secondary current signal. This system requires additional memory space, circuit board space, and added installation steps (e.g., to properly connect the jumper) which adds cost and complexity to the design.

The ETU typically will function, based on its programming, for overcurrent conditions up to eleven times the normal operating current of the system. However, some overcurrent conditions occur in time periods in which the microprocessor in the ETU does not function quickly enough to protect the equipment coupled to the circuit breaker.

There is a need for an analog circuit within the ETU that can respond to an overcurrent condition without relying on the microprocessor in the ETU. Further, there is a need for an improved circuit breaker design that would allow the same microprocessor and software program to be used for current transformers rated from 63 Amps to 1600 Amps, and beyond. Further, there may be circumstances when internal power to the ETU is not available and only external power to the ETU is required to be applied for programming or changing trip-curve parameters. The programming of the ETU is accomplished by a communication protocol imbedded in the ETU firmware and by a connection to a hand-held or table-top computer, that has an identical communication protocol installed and running. The current rating and curve parameters can easily be downloaded to the ETU. The ETU must be powered to be able to communicate. Further still, there is a need for an improved circuit breaker design that would facilitate ease of maintenance, repair, and installation of the circuit breaker.

SUMMARY OF THE INVENTION

One embodiment provides a circuit breaker having a trip mechanism and a power line for carrying a power signal from a source to a load and a current transformer configured to sense the power signal and provide a sense signal representative of the power signal to an electronic module in the circuit breaker. The electronic module has a circuit common potential, an application specific integrated circuit (ASIC), a control circuit, a composite circuit which generates a composite signal voltage, and a residual circuit used in ground fault protection. The circuit breaker comprises a first power supply to provide a first voltage signal and a second power supply to provide a second voltage signal. An analog override circuit is configured to receive the first voltage signal from the first power supply, the second voltage signal from the second power supply and the composite signal voltage from the composite circuit. The analog override circuit also provides an override signal to the ASIC. Also included is a logic function configured to receive a first trip signal from the control circuit and a second trip signal from the ASIC and to provide a third trip signal to the trip mechanism. Another embodiment of the circuit breaker includes an external power supply coupled to the electronic module at a point between the first power supply and the second power supply. Such external power supply selectively supplies power only to the second power supply. The second trip signal from the ASIC is provided only when the sum of the first voltage, the second voltage, and the composite voltage signal as determined within the analog override circuit is less than the circuit common potential.

Another embodiment provides an analog override circuit in a circuit breaker. The circuit breaker has a trip mechanism, a power line for carrying a power signal from a source to a load and a current transformer configured to sense the power signal and provide a sense signal representative of the power signal to an electronic module in the circuit breaker. The electronic module has a circuit common potential, an application specific integrated circuit (ASIC), a control circuit, a composite circuit which generates a composite signal, and a residual circuit. The analog override circuit is coupled to the ASIC, a first power supply and a second power supply. The analog override circuit comprises a first resistive circuit configured to receive a first voltage signal from the first power supply and a second resistive circuit configured to receive a second voltage signal from the second power supply and adding the two signals together. A third resistive circuit is configured to receive the composite signal. The sum of the three signals is an override signal that is sent to the ASIC. Another embodiment of the analog override circuit includes a capacitor configured in parallel with at least one resistor in the first resistive circuit. A further embodiment of the analog override circuit includes a logic function configured to receive a first trip signal from the control circuit and a second trip signal from the ASIC and providing a third trip signal to the trip mechanism. The logic function is configured as an OR gate. The analog override circuit can also include an external power supply coupled to the electronic module at a point between the first power supply and the second power supply and selectively providing power only to the second power supply.

A further embodiment provides a circuit breaker having a trip mechanism and a power line for carrying a power signal from a source to a load and a current transformer configured to sense the power signal and provide a sense signal representative of the power signal to an electronic module in the circuit breaker. The electronic module has a circuit common potential, an application specific integrated circuit (ASIC), a control circuit, a composite circuit which generates a composite signal voltage, a residual circuit, comprising a first means for supplying power to provide a first voltage signal and a second means for supplying power to provide a second voltage signal. A means for providing an override signal to the ASIC and a means for receiving a first trip signal from the control circuit and a second trip signal from the ASIC and providing a third trip signal to the trip mechanism.

DETAILED DESCRIPTION OF THE PREFERRED EMBODIMENTS

Figure 1:
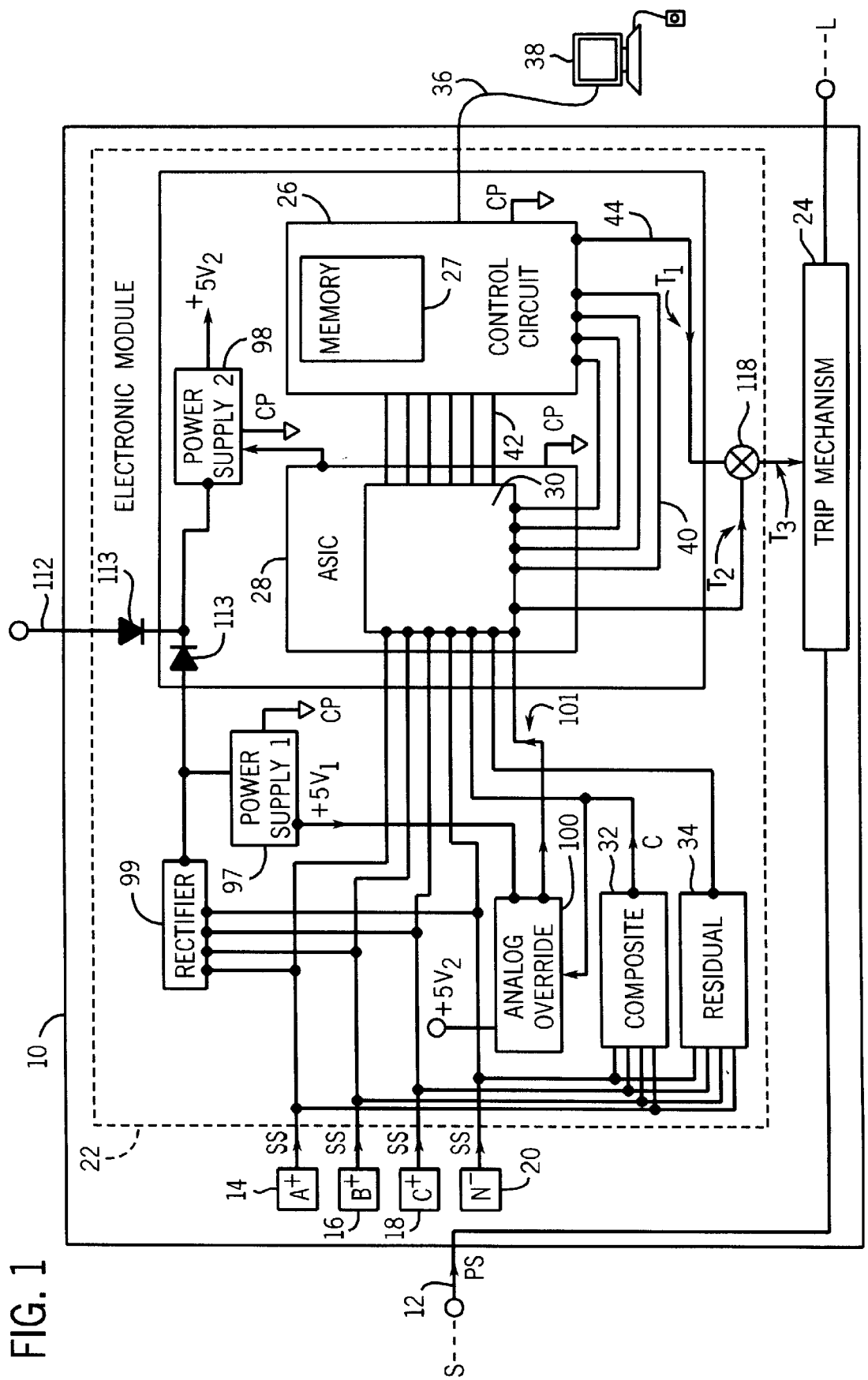
FIG. 1 is a block diagram of a circuit breaker according to an exemplary embodiment.

Referring to FIG. 1, a circuit breaker 10 is disclosed having a power line 12 for providing a power signal from a source (not shown) to a load (not shown). In this exemplary embodiment, the power signal is a three-phase power signal having four components designated as A+, B+, C+, and N−. Alternatively, a three phase power signal may be provided to a circuit breaker using only three components, namely A+, B+, and C+. Circuit breaker 10 further includes a plurality of sensing circuits (e.g., current transformers (CTs)) 14, 16, 18, and 20 coupled to an electronic module 22 (e.g., an electronic trip unit) that is coupled to a trip mechanism 24. Each of the current transformers 14, 16 and 18 is coupled around a line which receives the A phase portion, B phase portion, and C phase portion, respectively, of electrical power, as well as the N− phase portion. Power signals through each of the lines induce a corresponding sense signal in each respective current transformer. Current transformers 14, 16 and 18 could alternatively be other similar devices for detecting current in a line.

Electronic module 22 includes a control circuit 26 (e.g., a microprocessor or communications circuit) coupled to an application specific integrated circuit 28 (ASIC) having a programmable amplifier 30 (e.g., a gain stage amplifier) embedded therein. An analog override circuit 100 is included and coupled to the ASIC 28 and a composite circuit 32. Alternatively, control circuit 26 and ASIC 28 could be integrated as a system on a chip or into a microprocessor, or control circuit 26 could be a portion of ASIC 28.

Circuit breaker 10 further includes the composite circuit 32 and a residual circuit 34 coupled to programmable amplifier 30 and a communications port 36 (e.g., a connection terminal or electrical interface) coupleable to a personal computer 38 (e.g., a laptop computer, personal digital assistant, etc.).

During manufacturing, maintenance, installation, or repair, personal computer 38 is coupled to communications port 36. Personal computer 38 provides a data message to control circuit 26 via port 36. The data message is an RS-232 format digital serial message and includes data representing the current rating of sensing circuits 14–20 and the desired current rating of circuit breaker 10, which may or may not be the same. In this exemplary embodiment, the current ratings of sensing circuits 14–20 are all the same and range from 63 Amperes to 1600 Amperes, but may alternatively be different from one another and include ratings greater or less than those listed.

During operation, control circuit 26 generates a program message based on the data message. The program message is a four-bit digital message representing one of sixteen possible settings for programmable amplifier 30. Alternatively, the data message may be configured as any number of bits providing any number of possible settings. The program message is provided to programmable amplifier 30 of ASIC 28 along a bus 40. Sensing circuits 14, 16, 18, and 20 sense the A+ phase, B+ phase, C+ phase, and N− phase, respectively, of the power signal on power line 12 and provide four phase sense signals representative thereof to ASIC 28. Composite circuit 32 receives the four phase sense signals and provides a composite sense signal representing a composite of the phase sense signals to ASIC 28 and to the analog override circuit 100. Residual circuit 34 provides a residual sense signal representing a residual of the phase sense signals to ASIC 28. Composite circuit 32 and residual circuit 34 operate as disclosed in commonly assigned U.S. application Ser. No. 09/435,186 entitled "Method and Apparatus for Differentially Sensing Ground Fault and Individual Phases" by Bilac et al., which is herein incorporated by reference.

Programmable amplifier 30 amplifies the received sense signals according to a selected gain expressed by the program message and provides the amplified sense signals on a bus 42. Control circuit 26 receives the amplified sense signals from bus 42 and monitors these sense signals. Control circuit 26 may further apply an error correction factor to the sense signals in the form of a software amplification algorithm.

If the sense signals indicate that a circuit breaker trip is required (e.g., due to overcurrent, ground fault, etc.), control circuit 26 provides a first trip signal $T_1$ on a bus 44 to a logic circuit 118 configured as an "OR" circuit. The $T_1$ trip signal is "OR'ed" with a second trip signal $T_2$ generated in the ASIC 28 (as described hereafter), with a resultant third trip signal $T_3$ sent to the trip mechanism 24 which trips the circuit breaker, separating the source from the load along power line 12.

According to one exemplary overcurrent test, control circuit 26 receives the amplified sense signals and digitizes them (e.g., by utilizing an analog-to-digital (A/D) converter). Control circuit 26 then monitors the digitized sense signals. If one or more of the digitized sense signals exceeds the current rating of circuit breaker 10, control circuit 26 begins adding to an accumulator (e.g., a memory location) and eventually commands trip mechanism 24 to trip after a predetermined period of time. If the sense signals greatly exceed the current rating, control circuit 26 adds to the accumulator quicker than if the sense signals only marginally exceed the current rating.

The electronic module 22 includes a plurality of input terminals to ASIC 28, a plurality of attenuator circuits, a plurality of fixed gain amplifiers, a plurality of adjustable gain amplifiers, and a plurality of programmable amplifiers all as inputs. The electronic module 22 also has a circuit common potential CP. Sense signals from sensing circuits 14, 16, 18, and 20 and from residual circuit 34 are applied to input terminals of the programmable amplifier 30 as well as to the rectifier circuit 99. In this embodiment, the sense signals are differential signals and are generated as described in the above-referenced commonly assigned U.S. application Ser. No. 09/435,186 entitled "Method and Apparatus for Differentially Sensing Ground Fault and Individual Phases" by Bilac et al., previously incorporated by reference.

There are certain circumstances when an overcurrent condition may exist in the circuit in which the circuit breaker 10 is wired, being such that the need to open the circuit, i.e., trip the circuit breaker, must occur in a time period that is shorter than would be effected by the microprocessor on the electronic module 22. In such circumstances, the analog override circuit 100, after sensing the overcurrent condition, provides an override signal voltage 101 to the ASIC 28 from which the second trip signal $T_2$ is provided to the logic circuit 118, with a resulting third trip signal $T_3$ provided to the trip mechanism 24 to open the circuit breaker 10. Other circumstances may dictate that when there is no power in the circuit and therefore no power flowing through the circuit breaker 10 to energize the rectifier circuit 99, an external power must be provided for programming trip-curve characteristics, trip unit type and current rating. In such circumstances an external power supply 112, coupled to the electronic module 22 at a point between the first power supply 97 and the second power supply 98 is provided. The external power supply 112 provides power only to the second power supply 98 which provides power to the ASIC 28 as well as to the control circuit 26 thereby allowing changing or programming of parameters.

It should be understood that the second voltage signal $V_2$ can be provided as a result of: a) internal power from the rectifier circuit 99 to the second power supply 98 alone; b) as a result of an external power being provided by an external power supply 112 to the second power supply 98 alone; or, c) by a combination of internal and external power being provided to the second power supply 98.

The circuit breaker 10 can have a trip mechanism 22 connected through a power line 12 for carrying a power signal from a source S to a load L and a current transformer 14, 16, 18 and 20 configured to sense the power signal PS and provide a sense signal SS representative of a power signal PS to an electronic module 22 in the circuit breaker 10 with the electronic module 22 having an application specific integrated circuit (ASIC) 28, a control circuit 26, a composite circuit 32 which generates a composite signal voltage C, and a residual circuit 34.

The circuit breaker also is provided with a first power supply 97 to provide a first voltage signal $V_1$ and a second power supply 98 to provide a second voltage signal $V_2$ to the analog override circuit 100. The first and second power supplies 97 and 98 are mounted on the electronic module 22.

An analog override circuit 100 is configured to receive the first voltage signal $V_1$ from the first power supply 97, the second voltage signal $V_2$ from the second power supply 98 and the composite signal voltage C from the composite circuit 32 is contained on the electronic module 22. An override signal 101 is provided from the analog override circuit 100 to the ASIC 28. The reason for inclusion of the second power supply 98 voltage into the analog override circuit is to prevent nuisance tripping of the circuit breaker 10 at the time when the system power is amplified, i.e., circuit breaker is closed and current is flowing to the load while external power is still applied to the ETU. The inclusion of the second power supply 98 to the analog override circuit 100 keeps the override signal 101 above circuit common potential CP through the transients generated by the application of the system power seen on the composite voltage input C.

The override signal 101 is inputted to a differential amplifier 115 in the ASIC 28. The differential amplifier 115 is configured as a comparator and provides a second trip signal $T_2$ output when the sum of the first and second voltage signals $V_1$ and $V_2$ the composite signal C known as the override signal, is less negative than the circuit common potential CP. The second trip signal $T_2$ is inputted to a logic gate 118 configured to receive such second trip signal $T_2$ as well as the first trip signal $T_1$ from the control circuit 26. The logic circuit 118 is configured as a "OR" gate and produces a third trip signal $T_3$ for the trip mechanism 24. Upon receipt of the third trip signal $T_3$, the trip mechanism 24 operates to open the circuit breaker 10. When the external power supply 112 is utilized it provides a DC signal typically in the range of 7–9 volts DC.

The second trip signal $T_2$ is provided only when the sum of the first voltage signal $V_1$ and second voltage signal $V_2$ exceeds the composite signal voltage C.

The analog override circuit 100 comprises a first resistive circuit 103 configured to receive a first voltage signal from the first power supply 97. In a typical configuration, a pair of resistors 104 and 108 are connected in series to receive the $V_1$ signal. A second resistive circuit 105 is configured to receive a second voltage signal $V_2$ from the second power supply 98. Such second resistive circuit 105 typically has a resistor 102 connected to receive the second voltage signal $V_2$. The first resistor circuit 103 and second resistor circuit 105 are connected together at one end to provide an additive condition of the two signals $V_1$ and $V_2$. A third resistive circuit 109 is configured to receive the composite signal C from the composite circuit 32. The third resistive circuit 109 is configured with a resistor 110 which is connected at the same node as the first and second resistive circuits 103, 105 forming a voltage divider. The sum of the three signals $V_1$ and $V_2$ from the first resistive circuit 103 and the second resistive circuit 105 and the composite signal C, an override signal 101 is generated and provided to the ASIC 28, and specifically to the differential amplifier 115.

The analog override circuit 100 can include a capacitor 106 configured in parallel with at least one resistor 104 in the first resistive circuit 103. The capacitor 106 is included only for the motor startup applications, where an inrush currents of excess of 11× the rating can occur, by providing a jumper connecting $X_1$ and $X_2$ nodes. The tripping of the circuit breaker is delayed by 10 to 15 msec by delaying the summed signal to reach the amplitude that is more negative than the circuit common potential therefore delaying the tripping of the circuit breaker under motor start-up in-rush current conditions.

Figure 2:
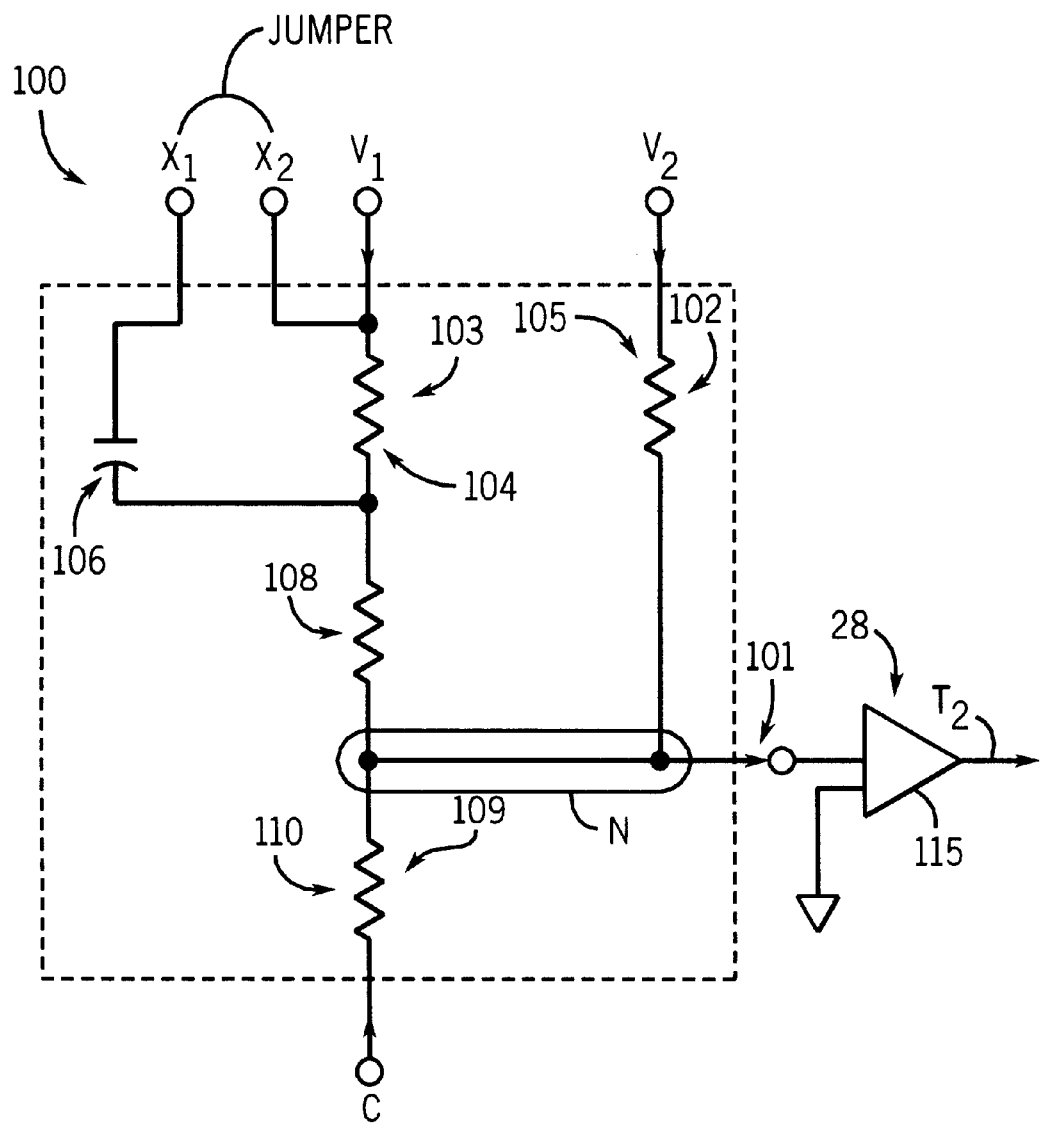
FIG. 2 is a schematic diagram of an analog override integrated circuit in the circuit breaker of FIG. 1.

An exemplary embodiment of the analog override circuit includes: a 4.99 k ohm resistor in series with a 10 k ohm resistor, with a 1.5 uf capacitor in parallel with the 4.99 k ohm resistor (if nodes $X_1$ and $X_2$ are connected only for motor protection application), comprising the first resistive circuit 103; a second resistive circuit 105 having a 249 k ohm resistor connected to the same node N as the 10 k ohm resistor of the first resistive circuit 103; and a third resistive circuit having an 11 k ohm resistor connected to the same node N as the first and second resistive circuits, as shown in FIG. 2, forming a voltage divider. From the node N, the override signal 101 is provided to the input of the differential amplifier 115 in the ASIC 28, from which the second trip signal $T_2$ is generated.

Thus, there is provided an analog override circuit in a circuit breaker which functions to bypass the microprocessor in the electronic module in the circuit breaker to provide, under certain conditions, a quicker trip signal to the trip mechanism and open the circuit breaker. In the drawings, specific examples, and the particular formulations given used to describe exemplary embodiments of the present invention serve as the purpose of illustration only. The systems shown and described are not limited to the precise details or conditions disclosed. For example, different combinations of resistors and capacitors can be utilized in the analog override circuit. Discreet variable resistors can be utilized that will allow changes in the characteristics in the analog override circuit to be made in the field as determined by a user of the circuit breaker. Furthermore, other substitutions, modifications, changes and omissions may be made in the design, operation, operating conditions and arrangements of the exemplary embodiments without departing from the scope of the invention as expressed in the appended claims.

What is claimed is:

1. A circuit breaker having a trip mechanism and a power line for carrying a power signal from a source to a load and a current transformer configured to sense the power signal and provide a sense signal representative of the power signal to an electronic module in the circuit breaker, with the electronic module having a circuit common potential, an application specific integrated circuit (ASIC), a control circuit, a composite circuit which generates a composite signal voltage, and a residual circuit, comprising:

a first power supply to provide a first voltage signal;

a second power supply to provide a second voltage signal;

an analog override circuit configured to receive the first voltage signal from the first power supply, the second voltage signal from the second power supply and the composite signal voltage from the composite circuit, and to provide an override signal to the ASIC; and, a logic function configured to receive a first trip signal from the control circuit and a second trip signal from the ASIC and to provide a third trip signal to the trip mechanism.

2. The circuit breaker of claim 1, including an external power supply coupled to the electronic module at a point between the first power supply and the second power supply and selectively providing power only to the second power supply.

3. The circuit breaker of claim 2, wherein the external power supply provides a DC signal.

4. The circuit breaker of claim 1, wherein the second trip signal is provided only when the sum of the first voltage signal, the second voltage signal and the composite signal voltage is more negative than the circuit common potential.

5. An analog override circuit in a circuit breaker, with the circuit breaker having a trip mechanism, a power line for carrying a power signal from a source to a load and a current transformer configured to sense the power signal and provide a sense signal representative of the power signal to an electronic module in the circuit breaker, the electronic module having a common circuit potential, an application specific integrated circuit (ASIC), a control circuit, a composite circuit which generates a composite signal, and a residual circuit, with the analog override circuit coupled to the ASIC, a first power supply and a second power supply, the analog override circuit comprising:

a first resistive circuit configured to receive a first voltage signal from the first power supply;

a second resistive circuit configured to receive a second voltage signal from the second power supply;

a third resistive circuit configured to receive the composite signal, and adding the three signals together; and, wherein when the sum of the three signals is less than the circuit common potential, an override signal is sent to the ASIC.

6. The analog circuit of claim 5, including a capacitor configured in parallel with at least one resistor in the first resistive circuit for purpose to delay the tripping of a circuit breaker under motor current in-rush conditions.

7. The analog circuit of claim 6, including a logic circuit configured to receive a first trip signal from the control circuit and a second trip signal from the ASIC, and providing a third trip signal to the trip mechanism.

8. The analog circuit of claim 7, wherein the logic circuit is configured as an OR gate.

9. The analog circuit of claim 8, wherein the first, second, and third resistive circuits, and the logic circuit are configured on the electronic module.

10. The analog circuit of claim 5, including an external power supply coupled to the electronic module at a point between the first power supply and the second power supply and selectively providing power only to the second power supply.

11. The analog circuit of claim 10, wherein the external power supply provides a DC signal.

12. The circuit breaker of claim 5, wherein the second trip signal is provided only when the sum of the first voltage, the second voltage and the composite signal voltage is less than the circuit common potential.

13. A circuit breaker having a trip mechanism and a power line for carrying a power signal from a source to a load and a current transformer configured to sense the power signal and provide a sense signal representative of the power signal to an electronic module in the circuit breaker, with the electronic module having a circuit common potential, an application specific integrated circuit (ASIC), a control circuit, a composite circuit which generates a composite signal voltage, a residual circuit, comprising:

a first means for supplying power to provide a first voltage signal;

a second means for supplying power to provide a second voltage signal;

a means for providing an override signal to the ASIC; and, a means for receiving a first trip signal from the control circuit and a second trip signal from the ASIC and providing a third trip signal to the trip mechanism.

14. The circuit breaker of claim 13, including a third means for supplying power coupled to the electronic module at a point between the first and second means for supplying power and selectively providing power only to the second means for supplying power, with the third means for supplying power external to the circuit breaker.

15. The circuit breaker of claim 14, wherein the third means for supplying power provides a DC signal.

16. The circuit breaker of claim 13, wherein the second trip signal is provided only when the sum of the first voltage signal, second voltage signal and the composite signal voltage is less negative than the circuit common potential.

* * * * *